(12) United States Patent
Siegwarth

(10) Patent No.: US 6,222,441 B1
(45) Date of Patent: Apr. 24, 2001

(54) PROCESS AND CIRCUIT FOR CONNECTING AN ACTUATOR TO A LINE

(75) Inventor: Martin Siegwarth, Esslingen (DE)

(73) Assignee: Richard Hirschmann GmbH & Co., Neckartenzlingen (DE)

( * ) Notice: Subject to any disclaimer, the term of this patent is extended or adjusted under 35 U.S.C. 154(b) by 0 days.

(21) Appl. No.: 08/894,979

(22) PCT Filed: Jan. 11, 1996

(86) PCT No.: PCT/EP96/00097

§ 371 Date: Mar. 2, 1998

§ 102(e) Date: Mar. 2, 1998

(87) PCT Pub. No.: WO96/26577

PCT Pub. Date: Aug. 29, 1996

(51) Int. Cl.[7] .................................. H04B 1/00; H02J 1/00
(52) U.S. Cl. ........................... 340/310.02; 340/310.07; 340/635; 340/650; 340/643; 307/40; 307/30; 361/55; 361/88; 361/171
(58) Field of Search ................. 340/310.01, 310.02, 340/310.06, 310.07, 310.08, 650, 651, 653, 662, 638, 643, 635, 663; 361/1, 42, 55, 91; 307/30, 40

(56) References Cited

U.S. PATENT DOCUMENTS

| | | | |
|---|---|---|---|
| 3,932,790 | * 1/1976 | Muchnick et al. | 340/651 |
| 3,950,742 | * 4/1976 | MacMartin et al. | 340/651 |
| 4,004,201 | * 1/1977 | Depuy | 340/650 |
| 4,037,155 | * 7/1977 | Ahmed | 340/664 |
| 4,223,365 | * 9/1980 | Moran | 340/664 |
| 4,592,069 | 5/1986 | Redding | 340/310.01 |
| 4,686,382 | * 8/1987 | Shuey | 340/310.06 |
| 4,879,625 | * 11/1989 | Potenzone | 340/662 |
| 4,903,006 | 2/1990 | Boomgard | 340/310.01 |
| 5,345,180 | * 9/1994 | Maier et al. | 340/650 |
| 5,477,091 | * 12/1995 | Fiorina et al. | 340/310.01 |

FOREIGN PATENT DOCUMENTS

| | | |
|---|---|---|
| 0 355 532 | 2/1990 | (EP) . |
| PCT/US91/ 05109 | 7/1991 | (WO) . |

* cited by examiner

Primary Examiner—Donnie L. Crosland
(74) Attorney, Agent, or Firm—Fulbright & Jaworski, L.L.P.

(57) ABSTRACT

An improved circuit and method for connecting a device to an actuator-sensor interface ("ASI") bus. The circuit provides the proper AC and DC coupling between the device and bus during normal operation, while providing AC and DC decoupling in the event of a short circuit or when the device is disconnected. The circuit accomplishes these goals while advantageously eliminating some of the components used in prior art circuits.

23 Claims, 3 Drawing Sheets

PROCESS AND CIRCUIT FOR CONNECTING AN ACTUATOR TO A LINE

BACKGROUND OF THE INVENTION

1. Field of the Invention

The invention relates to a process for connecting at least one load to a line which is provided both for supplying operating energy and for data transmission, the data signals and operating energy being decoupled with at least one reactor. The invention further relates to a circuit for connecting at least one load to a line which is provided both for supplying operating energy and for data transmission, with at least one reactor for decoupling of data signals and operating voltage. A reactor is an electrical component with inductive operating characteristics.

2. Description of the Related Technology

A process and circuit of this type are known in conjunction with two-wire bus lines, one of these bus lines being the so-called actuator-sensor interface bus, abbreviated ASI. Connected to the ASI bus are sensors such as photoelectric barriers, proximity switches, etc., with signals or information derived therefrom relayed to a master device and from there to consumers or actuators, such as solenoid valves, electromagnetic actuators, etc., via the bus. All system components such as the master device, power source, sensor and actuator electronics are connected exclusively by the ASI bus line which can be branched in any way to the different system components. Not only data signals are transmitted between the master device and sensors or actuators go via the two wires of the bus system, but the sensors and actuators are also supplied with the necessary operating energy via these two wires.

To make the wiring as simple as possible, the cable for the ASI bus is a simple unshielded two-wire line. The data signals are modulated symmetrically onto the line. This symmetry prevents the influence of noise on the bus system due to incident radiation of outside electromagnetic fields on the cable. In addition, the line symmetry prevents emission of electromagnetic noise by the cable caused by the high frequencies of the data signals.

The sensors and actuators connected to the ASI bus system and their built-in electronics do not influence the bus system symmetry if the two bus lines are not connected, for example, to the housing, and the capacitive loading of the two wires is roughly the same.

The sensors and actuators offered by manufacturers in most cases have a two- or three-lead terminal for connection to a control unit. These "binary sensors" are neither suited nor designed for connection to the ASI bus system. However, for connection of these components to the ASI bus system so-called user modules are available which convert the bus information into binary signals and vice versa. The sensors and actuators can be connected to these user modules using conventional DC voltage technology.

One example of a circuit in this prior art user module is shown schematically in FIG. 2 for connection of an actuator, for example an electromagnetic valve with inductive load 1. There is one reactor 4, 5 in each of the plus and minus bus line 2, 3. Reactor 4 of plus bus line 2 is at one terminal of inductive load 1 via switch 6 and reactor 5 is joined directly to the other terminal of inductive load 1. Between the terminals of reactors 4 and 5, facing inductive load 1, is electrolytic capacitor 7 and on the other side of switch 6 diode 8 and Zener diode 9 are parallel to inductive load 1, the anodes of diodes 8, 9 being connected to one another.

Reactors 4, 5 are used for decoupling of data signals from the operating voltage in two bus lines 2, 3. Electrolytic capacitor 7 prevents the bus current from having an overly high current gradient, i.e., an overly high value di/dt, when the load is connected and disconnected.

Normally the sensors represent a small ohmic or capacitive load and the user module can easily handle such a small load. The current necessary for the actuators is generally much higher than the current for the sensors. Switch 6, conventionally a relay switch, is necessary for connecting the actuator and is located between the actuator and electrolytic capacitor, so that the bus current does not reach overly high di/dt values when the load is connected and disconnected. Since this higher current flows through reactors 4, 5 of the user module, they must be made relatively large. Loads greater than approximately 2.5 watts cannot be supplied with electric power from the bus, but are dependent on an outside power source which must additionally be connected to the user module.

SUMMARY OF THE INVENTION

An object of the invention is to provide a much simpler and more cost-effective circuit and process for the user modules.

This object is achieved in a first embodiment by using the inductance of the load as the decoupling reactor.

Nearly all actuators have a small capacitance but a large inductance, as is the case, for example, in solenoids, electromagnetic valves, etc. Therefore the load inductance is already many times larger than that of the decoupling reactors of the conventional user modules. These decoupling reactors in the user module can therefore be eliminated with the advantage that the circuit is less expensive and losses due to decoupling reactors do not occur. A consumer with an inductive load can therefore be connected directly to the ASI bus system when this invention is used. The electrolytic capacitor can also be eliminated.

According to one advantageous embodiment of the invention, the line between the user module and actuator is a two-wire, symmetrical bus line. When the switch is conductive the actuator is directly on the bus. Only a direct current flows through the actuator due to its inductance. The bus is therefore not unduly loaded. When the switch is opened only one of the two bus lines of the ASI bus system is connected to the load, making the bus strongly asymmetrically loaded. By AC linking of the switch with a small capacitance which represents only a small resistance for the high frequency data signals, the bus line in which the open switch is located is AC-linked to the ASI bus system, so that symmetry is re-established even when the switch is not conductive.

When the inductive load is disconnected the energy stored in the coil of the consumer, for example in the magnet coil, must be reduced. Discharge via a diode or combination of diode and Zener diode connected parallel to the inductive load (compare FIG. 2) is not possible, since 1) the diode capacitance would represent an undue load on the ASI bus, and 2) due to the lack of a combination of reactors and electrolytic capacitors, when the switch is opened an unallowable di/dt value would arise because the coil current would be suddenly rerouted from the bus line to the diodes. The energy stored in the load inductance must discharge into the bus line via a diode when disconnected. According to one embodiment of the invention, instead of protective diodes parallel to the load, a Zener diode is used which is parallel to the switch. After opening the switch, the coil current flows in a slowly decreasing manner through the Zener diode, which has a breakdown voltage that should preferably be above the maximum voltage which occurs on the bus lines.

When a short circuit occurs in or behind the load, which can be a user module, the remaining bus system and especially the signal and data transmission which travel over the bus system should not be disrupted. This means that the symmetry of a two-wire bus system should not be adversely affected. Short circuit current limitation or disconnection is already conventional in ordinary user modules. According to one advantageous embodiment of the invention, therefore, both AC and DC are interrupted on the line when a short circuit occurs. The AC interruption is especially necessary when the switch is AC-linked because this prevents the data signals from being short circuited.

This object is also achieved by a circuit of the first embodiment in which, as described, the inductance of the load is provided as a reactor for decoupling. The advantages described in conjunction with the described process also apply to the described circuit.

Preferably the line is a two-wire symmetrical bus line. There is a switch in at least one of the lines. A capacitor is placed parallel to the switch to achieve AC linking of the switch and to prevent asymmetries in the bus system. The capacitor can thus be small and can be a cost-effective ceramic capacitor which represents only a small resistance for the high frequency data signals.

According to another very advantageous embodiment, a diode is placed parallel to the switch. As has already been described, the protective diode's of conventional circuits which are parallel to the load are not required. Preferably the diode is a Zener diode with a breakdown voltage which is greater than the largest voltage which occurs on the bus line. When the switch is opened, the coil current which is created by the energy stored in the inductor flows in a slowly decreasing manner due to the Zener diode.

A relay switch can be used for the switch. However the use of a transistor, especially a MOSFET transistor, is particularly advantageous. In addition to the cost advantage of using a transistor instead of a relay switch, the high di/dt values caused by the relay coil can also be avoided. The use of a MOSFET transistor, due to the Zener diode inherent in it, has the advantage that the Zener diode can be eliminated as an individual component.

As has already been explained, when a short circuit occurs on or behind the user module it is necessary to keep the effects of the short circuit away from the remaining bus system and especially from its data transmission. In the embodiment of the circuit with a capacitor parallel to the switch, the data signals in a short circuit pass around the switch via the capacitor and are therefore also short circuited. So another embodiment of the invention places one short circuit switch, for example relay contacts, in each wire of the bus line to enable data decoupling and maintain symmetry. DC interruption in the event of a short circuit is thus caused by the shift of the switches into the nonconductive state.

According to another advantageous embodiment of the invention, instead of the short circuit switch in each wire of the bus line there is an inductor for interrupting the AC connection in the event of a short circuit. Here it is advantageous if the short circuit inductors in the two wires each have the same inductance, which can be preferably very small and even zero in the state in which DC flows, i.e., in normal operation when a short circuit does not occur. Therefore, short circuit reactors that reach saturation at very small direct currents should be made or chosen. It is very advantageous if the ohmic resistance of the short circuit reactors is as small as possible. These short circuit reactors can be very small in volume and can be at least one order of magnitude smaller, and accordingly more cost-effective, than the reactors used in the bus wires of a conventional circuit.

As was detailed above, with the process and circuit claimed in the invention there are very cost-effective possibilities for connecting inductive loads to the bus system and triggering them via the bus system. A circuit as described for this purpose requires simply a transistor as the switch and an inexpensive ceramic capacitor, in contrast to conventional circuits in which two reactors, an electrolytic capacitor, a relay or transistor and additional protective diodes are necessary.

The circuit as claimed in the invention is especially advantageous in conjunction with the ASI bus system and with user modules which are provided for connecting load and sensor components, and which have circuits that convert analog data signals into binary data signals and vice versa. The load is an inductive load or an actuator, especially an electromagnetic valve, a solenoid, etc.

DETAILED DESCRIPTION OF THE INVENTION

Figure 1:
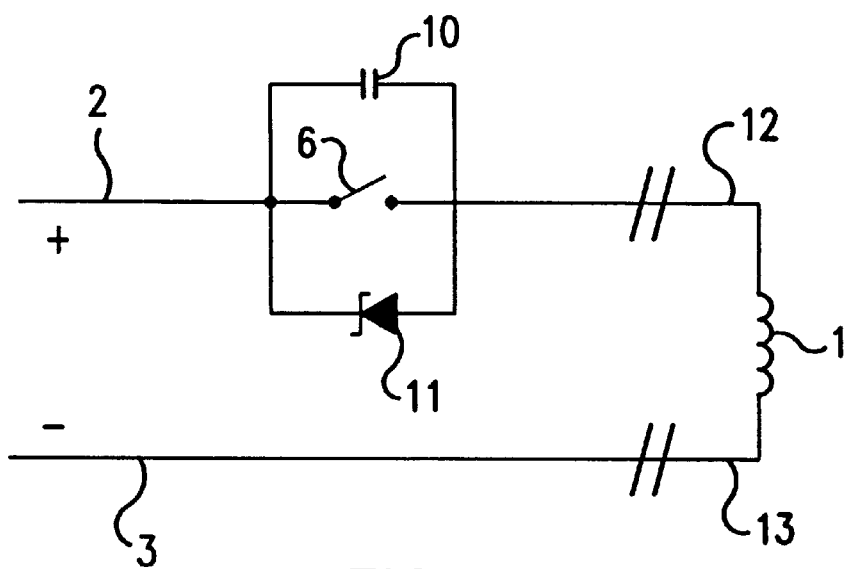
FIG. 1 shows a schematic of one embodiment of a circuit of the invention.
Figure 2:
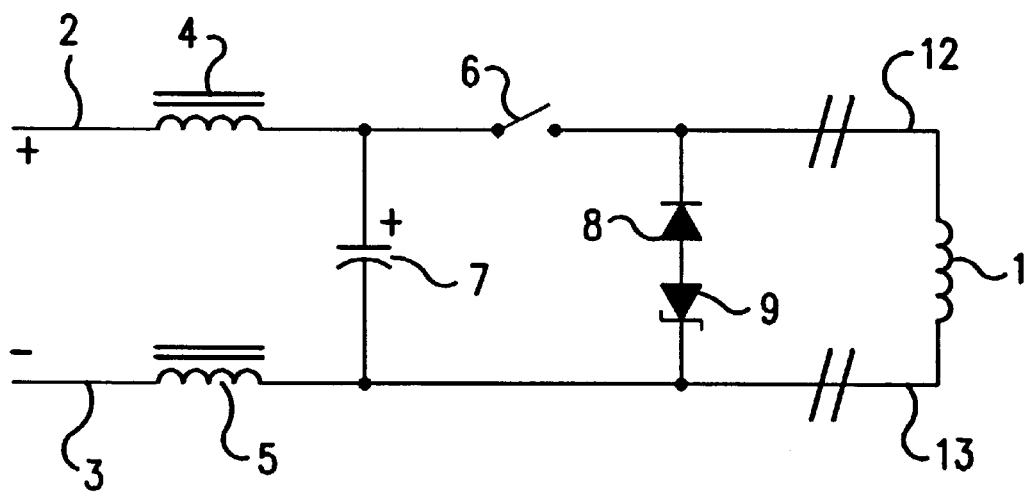
FIG. 2 shows a schematic of a conventional circuit for a user module of an ASI bus system.

In the embodiment of the circuit shown in FIG. 1, the reference numbers used in FIG. 2 are used for the same parts.

Referring to FIG. 1, inductive load 1, for example the coil of a solenoid or electromagnetic valve, is joined using one terminal via wire 12 and switch 6 to plus bus line 2 and using the other terminal via wire 13 directly to minus bus line 3 of an ASI bus system. Capacitor 10, which can be a ceramic capacitor with a small capacitance, is parallel to switch 6. Capacitor 10 forms an AC connection to wire 12 so that symmetry of the bus system is ensured even when switch 6 is opened.

Furthermore, Zener diode 11 is parallel to switch 6, its anode being connected to the terminal of load 1 and its cathode being connected to plus bus line 2. When switch 6 is opened the energy stored in load 1 is reduced through a slowly decreasing current via Zener diode 11. Protective diodes 8, 9 (compare FIG. 2) which are parallel to load 1 and which are necessary in conventional circuits are therefore unnecessary.

In the circuit of the invention, decoupling reactors for decoupling the data signals and the power supply voltage on the bus system are not necessary because this is caused by the inductance of load 1 as described for the invention. In addition, electrolytic capacitor 7, which is necessary in conventional circuits of this type (compare FIG. 2) and which is needed there for limiting the di/dt values when the load is connected and disconnected, is not necessary so that the circuit as claimed in the invention is much less expensive with the same manner of operation.

Figure 3:
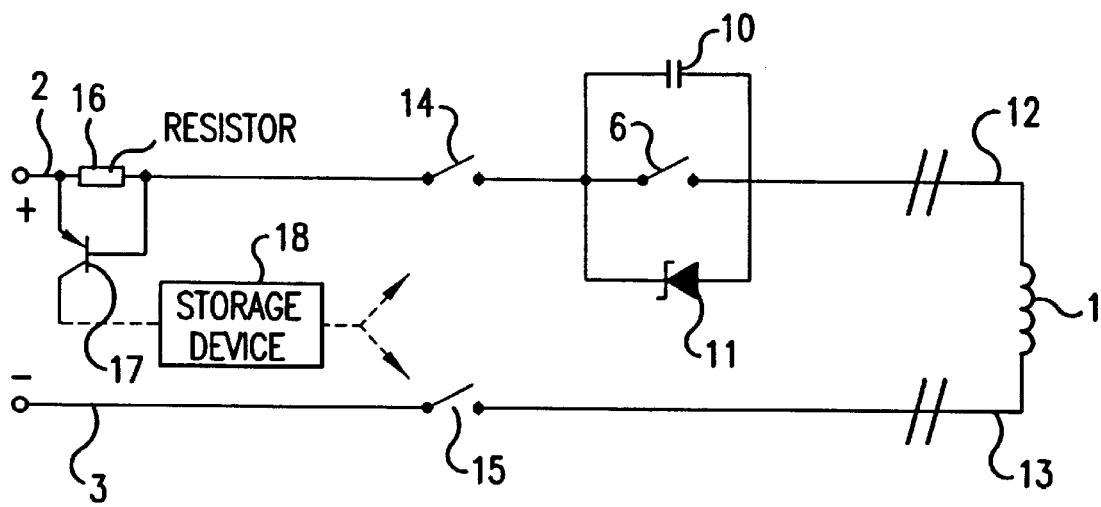
FIG. 3 shows a schematic of an embodiment of a circuit of the invention with measures for DC and AC interruption of the line when a short circuit occurs.

In the embodiment shown in FIG. 3 there are short circuit switches 14, 15 both in plus bus line 2 and also in minus bus line 3. When a short circuit occurs in the line or in the user module which encompasses load 1, this is detected by a tap on resistor 16 and the tapped voltage is delivered via transistor 17 to storage device 18 with an output signal which shifts short circuit switches 14, 15 into the nonconductive state. In this way, both DC and AC interruption occur so that operation of the remaining bus system is not adversely affected by the short circuit, and in particular the bus system symmetry necessary for data transmission is maintained.

Figure 4:
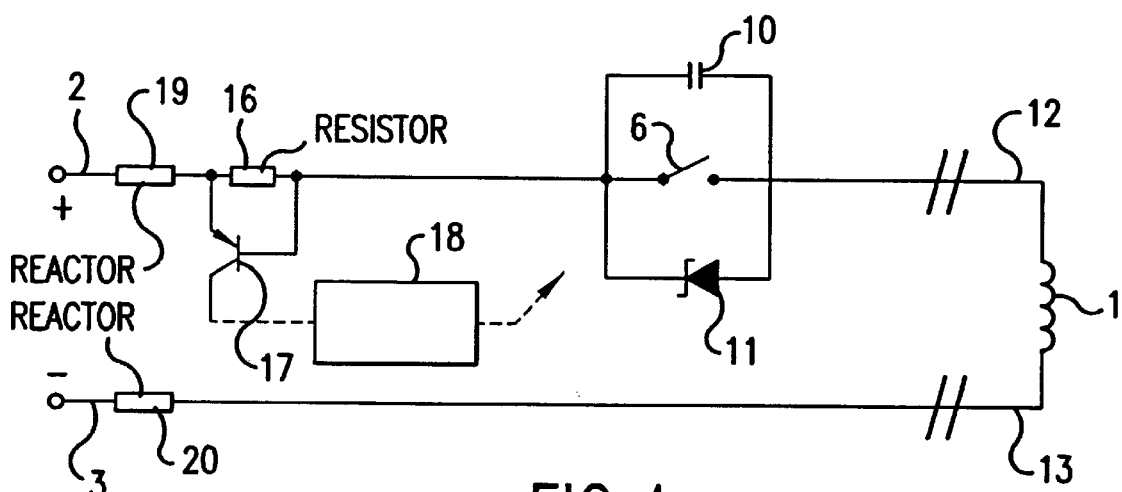
FIG. 4 shows a schematic of another advantageous embodiment of the circuit of the invention for DC and AC interruption of the line when a short circuit occurs.

One very advantageous, cost-effective embodiment of the circuit when dealing with a short circuit condition is shown in FIG. 4. When a short circuit occurs behind or in the user module encompassing load 1, this is in turn detected by the tap on resistor 16. As with the embodiment shown in FIG. 3, the tap voltage passes via transistor 17 to storage device 18, which produces an output signal that moves switch 6. Switch 6 is provided already for connecting and disconnecting load 1 into the nonconductive state. In this way DC interruption is achieved for the short circuit condition. Since switch 6, however, is DC linked by capacitor 10, and an AC short circuit of the data signals is still present, provisions must be made for AC interruption. This is caused, according to the embodiment of the circuit shown in FIG. 4, by short circuit reactors 19 and 20 placed in plus bus line 2 and also in minus bus line 3. Short circuit reactors 19, 20 preferably have the same inductance, but only have inductance in the DC-free state. Therefore when a short circuit and open switch 6 occur, they must have their inductance active for AC interruption. In normal operation, if no short circuit occurs switch 6 is closed and therefore direct current is flowing through short circuit reactors 19, 20, the inductance of these short circuit reactors 19, 20 can be very small or even zero. This means that very small reactors can be used which become saturated when very small direct currents flow through them. The point is to keep the ohmic resistance of short circuit reactors 19, 20 small to minimize power losses. The volume of short circuit reactors 19, 20 is therefore less by at least one order of magnitude than in reactors 4, 5 used in the known circuit for small loads. Accordingly the costs for short circuit reactors 19, 20 are also much less.

Figure 5:
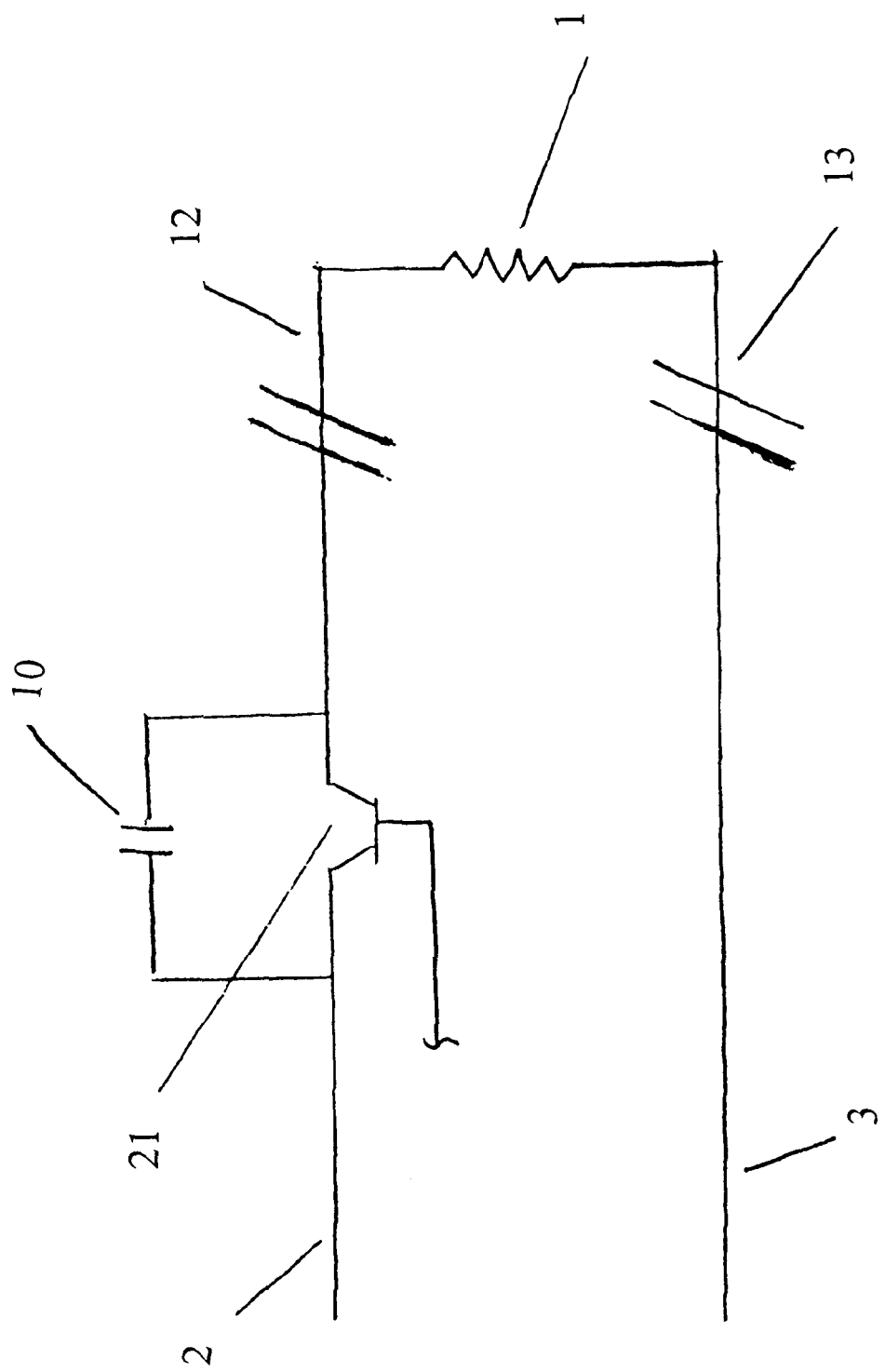
FIG. 5 shows a schematic of another advantageous embodiment of the circuit of the invention using a transistor as a disconnection switch.

FIG. 5 shows a schematic of another advantageous embodiment of the circuit of the invention using a transistor 21 as a disconnection switch.

The embodiments described herein are intended to be illustrative and not restrictive. Other obvious variations may occur to those of skill in the art. The invention is intended to cover all such variations and be limited only by the scope of the appended claims.

I claim:

1. A method for connecting at least one actuator to a line with data signals and operating DC voltage decoupled with at least one reactor, comprising the step of:

using an actuator inductance of the actuator as a decoupling reactor.

2. The method of claim 1, further comprising the steps of:

providing a symmetrical two-wire bus as the line; and providing an AC-linked switch in series with one wire of said two-wire bus.

3. The method of claim 2, further comprising the steps of:

disconnecting said actuator;

causing energy stored in said actuator inductance to flow via a diode connected in parallel with said switch.

4. The method of claim 1, further comprising the steps of:

interrupting said data signals and operating DC voltage when a short circuit occurs on the line.

5. A circuit for connecting at least one actuator to a line providing both data signals and an aerating voltage, and having at least one reactor for decoupling the data signals and the operating voltage, comprising:

an actuator inductance of the actuator coupled to said line, said actuator inductance being a decoupling reactor.

6. The circuit of claim 5, wherein said line is a two-wire symmetrical bus.

7. The circuit of claim 6, further comprising:

a switch;

wherein said line includes first and second bus lines; and said switch is coupled in at least one of said first and second bus lines.

8. The circuit of claim 7, further comprising a capacitor connected in parallel with said switch.

9. The circuit of claim 8, further comprising a zener diode connected in parallel with said switch.

10. The circuit of claim 9, wherein:

said line has a maximum occurring voltage;

said zener diode has a breakdown voltage; and said breakdown voltage is greater than said maximum occurring voltage.

11. The circuit of claim 7, wherein said switch is a relay.

12. The circuit of claim 7, wherein said switch is a transistor.

13. The circuit of claim 12, wherein said transistor is a MOSFET.

14. The circuit of claim 5, wherein:

said line includes first and second bus lines; and said circuit further comprises a first short circuit switch in said first bus line and a second short circuit switch in said second bus line.

15. The circuit of claim 7, further comprising:

a first short circuit reactor in said first bus line for interrupting an AC signal on said first bus line during a short circuit; and a second short circuit reactor in said second bus line for interrupting an AC signal on said second bus line during a short circuit;

wherein said switch is non-conductive during a short circuit.

16. The circuit of claim 15, wherein said first and second short circuit reactors have approximately equal inductance.

17. The circuit of claim 15, wherein said first and second short circuit reactors have very small inductance when conducting direct current.

18. The circuit of claim 15, wherein said first and second short circuit reactors have very small ohmic resistance.

19. The circuit of claim 5, wherein said line is an actuator-sensor interface bus.

20. The circuit of claim 19, wherein said circuit is a module for connecting at least one actuator component to said actuator-sensor interface bus.

21. The circuit of claim 19, wherein said circuit is a module for connecting at least one sensor component to said actuator-sensor interface bus.

22. The circuit of claim 5, further comprising circuitry coupled to the line and converting serial data signals into binary data signals and converting binary data signals into serial data signals.

23. The circuit of claim 5, further comprising a master device coupled to the line for providing the data signals.

\* \* \* \* \*